Patented July 7, 1931

1,813,685

UNITED STATES PATENT OFFICE

CYRIL J. STAUD AND CHARLES S. WEBBER, OF ROCHESTER, NEW YORK, ASSIGNORS TO EASTMAN KODAK COMPANY, OF ROCHESTER, NEW YORK, A CORPORATION OF NEW YORK

PROCESS FOR CHANGING THE SOLUBILITY OF CELLULOSE ACETATE

No Drawing.   Application filed September 26, 1929.   Serial No. 395,452.

This invention relates to a process for the hydrolysis of cellulose esters, and particularly the hydrolysis of chloroform soluble cellulose acetate to acetone solubility.

There are a great number of known methods for the preparation of cellulose acetate to the fully acetylated ester, the tri-acetate, and there are equally as many processes for the hydrolysis of the tri-acetate of cellulose, which is generally designated as the chloroform soluble acetate, to a solubility in acetone or other solvents. This hydrolysis is generally carried out in a solution of acetic acid as such a solution results when cellulose is synthesized by acetylation in an acetic anhydride acetic acid bath containing a suitable catalyst. To this reaction mixture water is added to stop further acetylation of the cellulose, together with a hydrolytic catalyst, such as a strong mineral acid, acid salt, or the like. The resulting solution is maintained at a temperature of approximately 50° C. with the production of the acetone soluble variety of the cellulose acetate in 18 to 48 hours. The cellulose acetate is separated from the by-products of the reaction by precipitating the mass into water.

Cellulose acetate, when thus prepared, while suitable for many purposes in which the color of the cellulose acetate is not of prime importance, is not the best type of cellulose acetate for use in the photographic and rayon arts, or, for that matter, in the lacquer industry where the lacquer is to be used clear. This is due to the fact that the film obtained from such a cellulose acetate is generally of a slightly yellow or brownish color which is objectionable, particularly for thick films. To utilize this product it is often necessary to submit the hydrolyzed cellulose esters to a final bleaching operation.

An object of the present invention is to provide a process for the hydrolysis of cellulose esters. Another object is to conduct the hydrolysis of cellulose esters in the presence of a gaseous medium whereby the ester is simultaneously hydrolyzed and bleached. A further object is to effect an increase in the viscosity of the cellulose acetate during its hydrolysis. Other objects will hereinafter appear.

We have found that the introduction of an oxide of nitrogen into the cellulose acetate solution before, or during hydrolysis, produces a whiter product, which has a greater viscosity than the cellulose acetate or ester prepared by the usual processes. To produce the optimum results, of course, it is necessary that the gaseous medium be present in the hydrolyzing bath throughout the period of hyrdolysis, although in some instances it will be evident that such a thorough conditioning of the cellulose ester may not be required.

It has been found that by introducing oxides of nitrogen, especially nitrogen dioxide or its dimer, nitrogen textraoxide, into an acetic acid solution of cellulose acetate before or during hydrolysis, a product will result which is free from color and substantially undegraded. These gases are suitable for use not only with cellulose acetate, which at the present time is the organic ester of cellulose which is of the greatest importance from the commercial standpoint, but are likewise useful for the hydrolysis of other organic esters of cellulose such, for example, as cellulose formate, propionate, butyrate and other acyl esters of cellulose.

The oxides of nitrogen may be added to the hydrolyzing bath in any one of a number of ways, some of which will readily suggest themselves to the expert in this art. As nitrogen dioxide is very readily soluble in glacial acetic acid, the simplest method of introducing it is to bubble the gas into an acetic acid solution of the cellulose acetate until the desired amount has been absorbed. Another method is to add an acetic acid solution to the bath which has, prior to its addition, been saturated with the oxide of nitrogen. While it is best to generate the gas externally, it is nevertheless possible to produce it within the hydrolyzing bath itself. This may be done by the addition of an organic nitrite or nitrate as ethyl nitrite, amyl nitrite, guanidine nitrate, or the addition of nitrous acid or other materials that decompose or react in acid to produce nitrogen dioxide. The generation of this gas in the bath by the addition thereto of inorganic salts is apt, however, to cause a retardation of the action of the hydrolytic catalyst employed. It should, therefore, be borne in mind that a corresponding increase in the amount of the hydrolytic catalyst should be employed in order that the cellulose acetate be hydrolyzed to the desired extent.

While the gases are generally added to the hydrolyzing bath at or about room temperature and atmospheric pressure, the addition may be made at a higher temperature and pressure if so desired in order that a greater concentration of the gas may be present in the hydrolyzing bath. While this somewhat increases the velocity of the reaction and results in some instances in a greater increase in viscosity of the cellulose acetate, we have found that such an expedient is not generally required. The occlusion, however, in the solution of the greater quantities of the gas, increases the fluffiness of the cellulose ester when it is precipitated after hydrolysis, and particularly so if the precipitating bath is heated to a temperature which rapidly releases the dissolved gas from solution.

This advantageous result is likewise evident when carrying out the operations at room temperature and atmospheric pressure. The fluffing of the cellulose acetate by this action has many advantages as it renders the subsequent washing and later drying and redissolving of the ester more readily and quickly carried out.

The concentration of the gaseous mediums in the bath will vary considerably with the type of cellulose ester it is desired to obtain. If a cellulose ester of maximum viscosity and whiteness is sought, a greater concentration of the gaseous medium should be used, while for most purposes the concentration as described in the following examples is satisfactory.

We shall now give an example for carrying out our invention but it shall be distinctly understood that we are not limited by the proportions or other details therein given except as they are indicated in the appended claims.

For example, 50 parts of glacial acetic acid saturated with nitrogen tetroxide or nitrogen dioxide may be added to 367 parts of fully acylated cellulose acetate in solution as prepared, for instance, by the process described in U. S. Patent 1,683,347 of H. Le B. Gray and C. J. Staud. The excess acetic anhydride in this solution having been decomposed by water and an excess of 20 parts of water containing 2 parts of concentrated hydrochloric acid (specific gravity 1.19) hydrolysis is continued for 15 hours at 38 degrees C. The temperature of the bath may then be raised to 50 degrees C. and maintained for 8½ hours, and after standing at room temperature for another 18 hours, the product may be precipitated from the acetic acid solution by pouring into warm water in a fine stream. The precipitated cellulose acetate after being washed acid-free, dried and subsequently dissolved in an acetone solution, when compared with a test cellulose acetate produced under identical conditions except that no nitrogen peroxide was used, revealed that the nitrogen peroxide treated cellulose acetate was whiter and more viscous than that which has not been treated with this gas.

It is well know that a cellulose acetate which has a high viscosity is one in which there is little, if any, degradation of the cellulose molecule. It is evident, therefore, that cellulose acetate hydrolyzed by this process results in a product the degradation of which has not been appreciably increased by the hydrolyzing bath.

It is evident that any of the reactive oxides of nitrogen may be used in our process with various concentrations thereof, while numerous methods of introducing them into the hydrolyzing bath may be employed, as indicated above, without departing from this invention or sacrificing any of its advantages.

What we claim as new and desire to secure by Letters Patent is:

1. In the process for the preparation of organic esters of cellulose, the step which comprises hydrolyzing the cellulose ester in a bath containing an oxide of nitrogen.

2. In the process for the preparation of cellulose acetate the step which comprises hydrolyzing the cellulose acetate in a bath containing an oxide of nitrogen.

3. In the process for the preparation of cellulose esters the step which comprises adding to the hydrolyzing bath an acetic acid solution containing an oxide of nitrogen.

4. In the process for the preparation of cellulose acetate the step which comprises adding to the hydrolyzing bath an acetic acid solution containing an oxide of nitrogen.

5. In the process for the preparation of cellulose acetate the step which comprises adding to the hydrolyzing bath an acetic acid solution containing nitrogen dioxide.

6. In the process for the preparation of cellulose acetate the step which comprises hydrolyzing the cellulose acetate in an acetic acid solution saturated with an oxide of nitrogen.

Signed at Rochester, New York, this 21st day of September, 1929.

CHARLES S. WEBBER.
CYRIL J. STAUD.